United States Patent [19]

Treace

[11] 3,869,795
[45] Mar. 11, 1975

[54] CUTTING BLADE FOR USE WITH AN OSCILLATING CAST CUTTER

[75] Inventor: Harry T. Treace, Forest Hill, Tenn.

[73] Assignee: Richards Manufacturing Company, Memphis, Tenn.

[22] Filed: June 20, 1973

[21] Appl. No.: 371,672

[52] U.S. Cl............ 30/388, 30/355, 83/848
[51] Int. Cl............ B27b 9/00, B27b 33/08
[58] Field of Search............ 30/133, 276, 347, 355, 30/388, 390, 391, 263, 264; 83/836, 846, 848, 851, 849, 850; 125/15, 22; 51/206 R

[56] References Cited
UNITED STATES PATENTS

| | | | |
|---|---|---|---|
| 352,867 | 11/1886 | Greist | 83/848 |
| 567,748 | 11/1874 | Andrews | 83/848 X |
| 1,744,597 | 1/1930 | Vasconcellos | 30/347 X |
| 1,931,363 | 10/1933 | Stubbs | 51/206 R |
| 2,649,868 | 8/1953 | Gommel | 125/15 X |
| 2,795,247 | 6/1957 | Topolinski | 83/848 |
| 3,091,851 | 6/1963 | Cummins | 30/264 X |
| 3,103,069 | 9/1963 | Gary | 30/133 X |

Primary Examiner—Al Lawrence Smith
Assistant Examiner—J. C. Peters
Attorney, Agent, or Firm—John R. Walker, III

[57] ABSTRACT

A cutting blade for use in removing plaster casts or the like from a person's body with an oscillating cast cutter. The blade includes a square-shaped aperture for mounting the blade onto a square-shaped portion of a drive arbor of the cast cutter in any one of four positions. Saw teeth or the like are provided on the periphery of the blade. The selection of positions of the blade on the drive arbor allows each quadrant of the blade to be selectively positioned in the area of contact with the cast being cut.

3 Claims, 3 Drawing Figures

PATENTED MAR 11 1975　　　　　　　　　　　　　　3,869,795

CUTTING BLADE FOR USE WITH AN OSCILLATING CAST CUTTER

BACKGROUND OF THE INVENTION

1. Field of the Invention

This invention relates generally to cast cutters and more specifically to cutting blades for use with oscillating cast cutters.

2. Description of the Prior Art

The following U.S. Pat. Nos. are known to relate to the same general field of the present invention: Mead, 1,876,337; Christen, et al., 2,300,952; Hood, et al., 2,399,677; Stryker, 2,427,580; Cecere, 3,044,171; Cummins, 3,091,851; Gary, 3,103,069; and Shaheen, 3,199,194. None of the above patents disclose or suggest the present invention.

Stryker, Cecere, Cummins, Gary, and Shaheen disclose cast cutters having oscillating cutting blades. One problem in such oscillating cast cutters has been the cost of the blades as compared to their useful life. One solution to this problem is suggested by the Cummins reference. Cummins suggests turning the cutter blade on the drive arbor so as to present a fresh cutting edge to the cast being removed. Cummins discloses two methods of securing the blade against rotation on the arbor in selected positions. In one method, a plurality of keyways are provided in the blade and arbor. A selected keyway in the blade is simply aligned with a selected keyway in the arbor and a key is passed therethrough. In the other method, a plurality of holes are formed in the blade and a pin is passed through a selected hole in the blade and through a hole in a rocker arm. Both of these methods are disadvantageous in that the high frequency required in oscillating cast cutters causes extremely high stress forces to occur in the cutting blades and therefore promotes fractures and breaks in the keyways and pins.

SUMMARY OF THE INVENTION

The present invention is directed towards overcoming the problems and disadvantages in previous cutting blades for use with oscillating cast cutters. The concept of this invention is to provide a cutting blade having a square-shaped aperture for mounting onto a square-shaped portion of a drive arbor of an oscillating cast cutter. The square-shaped aperture presents four bearing surfaces to reduce the stress forces between the drive arbor and the cutting blade. The square-shaped aperture may include radii portions in each corner thereof to further reduce the stress concentration at the corners.

DESCRIPTION OF THE PREFERRED EMBODIMENT

Figure 1:
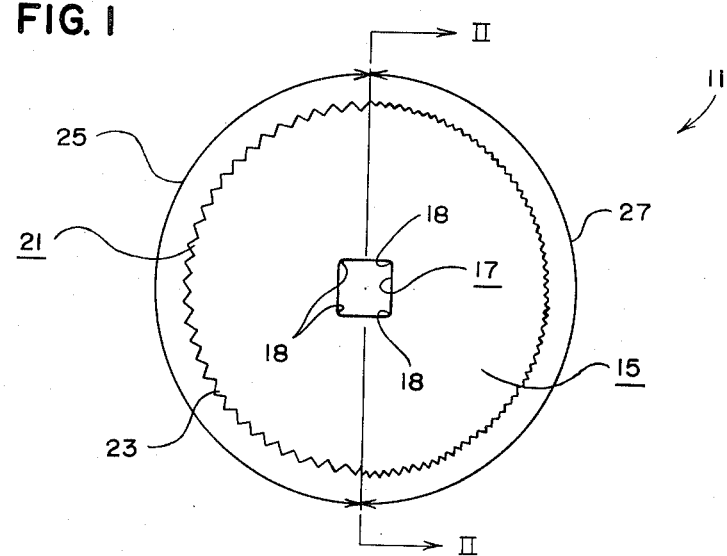
FIG. 1 is a front elevational view of the cutting blade of the present invention.
Figure 2:
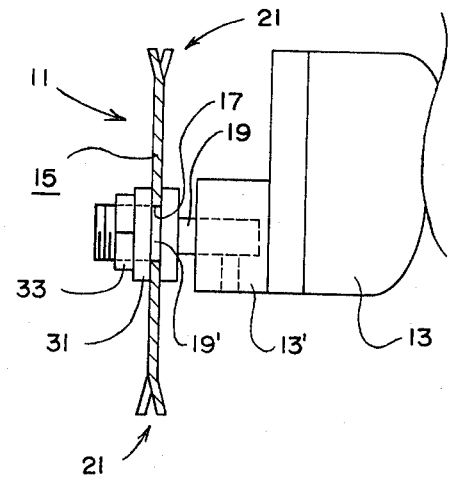
FIG. 2 is a sectional view of the present invention as taken on line II—II of FIG. 1 with a portion of the cast cutter and the drive arbor shown diagrammatically.
Figure 3:
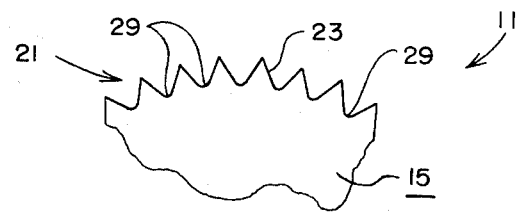
FIG. 3 is an enlarged portion of the cutting teeth of the present invention.

The preferably circular cutting blade 11 of the present invention is for use with an oscillating cutting device such as an oscillating cast cutter 13. The '580 reference discloses such an oscillating cast cutter. The cutting blade 11 includes a body portion 15 having a square-shaped aperture 17 therein. Radii portions may be included in each corner of the aperture 17. A drive arbor 19 having a square-shaped portion 19' is provided on the oscillating cast cutter 13 and may be mounted to the cast cutter 13 in one of three positions by a triangular chuck 13' known to those skilled in the art. The square-shaped aperture 17 allows the cutting blade 11 to be selectively positioned on the square-shaped portion ' of the drive arbor 19 in one of four positions. A cutting portion 21 is located on the periphery of the body portion 15. The cutting portion 21 preferably comprises saw teeth 23 but may comprise diamond dust, carborundum or the like. The cutting portion 21 may include a plurality of segments having different grades of cutting surfaces. For example, the cutting portion 21 may include a first segment as indicated at 25 of coarse cutting teeth around substantially 180° of the body portion 15 and a second segment as indicated at 27 of fine cutting teeth around substantially the other 180° of the body portion 15. Radii portions 29 are preferably provided at the base of each saw tooth 23 to prevent the clogging thereof.

The use of the cutting blade 11 of the present invention is quite simple. After the drive arbor 19 is mounted onto the triangular chuck of the cast cutter 13 by means of a set screw or the like, the cutting blade 11 is positioned on the square-shaped portion 19' of the drive arbor in one of the four positions available. A washer 31 and a nut 33 fixedly secures the cutting blade 11 to the drive arbor 19. In operation, the cast cutter 13 is preferably axially rotated back and forth by hand over a short arc to enhance the cutting efficiency of the cutting blade 11. When the cast cutter 13 is axially rotated, approximately 90° of the cutting blade 11 is utilized in the cutting operation. To present a fresh cutting edge or to present a different grade of cutting surface, the nut 33 is loosened and the cutting blade 11 removed from the square-shaped portion 19' of the drive arbor 19 and rotated either 90°, 180°, or 270°. The cutting blade 11 is then replaced on the square-shaped portion 19' of the drive arbor 19 and the nut 33 retightened. In utilizing such a method, the entire 360° of the cutting portion 21 of the cutting blade 11 may be utilized.

Although the invention has been described and illustrated with respect to a preferred embodiment thereof, it is not to be so limited since changes and modifications may be made therein which are within the full intended scope of the invention.

I claim:

1. A cutting blade for use with an oscillating cast cutter having a drive arbor including a square-shaped portion, said cutting blade comprising:

a. a circular body portion having a square-shaped aperture for selectively positioning said body portion on the square-shaped portion of the drive arbor in one of four positions, said square-shaped aperture including radii portions in each corner thereof to reduce the stress concentration at the corners; and b. a cutting portion located on the periphery of said body portion, said cutting portion including a first segment of coarse cutting teeth around substantially 180° of said body portion and a second segment of fine cutting teeth around substantially the other 180° of said body portion, said cutting portion including radii portions at the base of each cutting tooth to prevent the clogging thereof.

2. The combination with an oscillating cast cutter and a drive arbor having a square-shaped portion of a circular cutting blade, said cutting blade comprising:
   a. a body portion having a square-shaped aperture for selectively positioning said body portion on the square-shaped portion of the drive arbor in one of four positions; and
   b. a cutting portion located on the periphery of said body portion, said cutting portion including a first segment of coarse cutting teeth around substantially 180° of said body portion and a second segment of fine cutting teeth around substantially the other 180° of said body portion.

3. The combination with an oscillating cast cutter and a drive arbor having a square-shaped portion and being mounted to the cast cutter in one of three positions by a triangular chuck, of a cutting blade, said cutting blade comprising:
   a. a circular body portion having a square-shaped aperture for selectively positioning said body portion on the square-shaped portion of the drive arbor in one of four positions, said square-shaped aperture including radii portions in each corner thereof to reduce the stress concentration at the corners; and
   b. a cutting portion located on the periphery of said body portion, said cutting portion including a first segment of coarse cutting teeth around substantially 180° of said body portion and a second segment of fine cutting teeth around substantially the other 180° of said body portion, said cutting portion including radius portions at the base of each cutting tooth to prevent clogging thereof.

* * * * *